US011554509B1

(12) United States Patent
Feil (10) Patent No.: US 11,554,509 B1
(45) Date of Patent: Jan. 17, 2023

(54) DRIP IRRIGATION FEEDER PIPE SLICER TOOL AND METHOD OF DETACHING BARBED FITTINGS AND DEVICES USING THE SAME

(71) Applicant: Lowell Dean Feil, Dixon, CA (US)

(72) Inventor: Lowell Dean Feil, Dixon, CA (US)

( * ) Notice: Subject to any disclaimer, the term of this patent is extended or adjusted under 35 U.S.C. 154(b) by 0 days.

(21) Appl. No.: 17/374,019

(22) Filed: Jul. 13, 2021

(51) Int. Cl.
| | |
|---|---|
| *B26B 1/08* | (2006.01) |
| *B26B 29/06* | (2006.01) |
| *A01G 25/02* | (2006.01) |

(52) U.S. Cl.
CPC ............... *B26B 1/08* (2013.01); *B26B 29/06* (2013.01); *A01G 25/02* (2013.01)

(58) Field of Classification Search
CPC .. H02G 1/1217; H02G 1/1229; B23D 45/122; B23D 21/06; B26B 1/08; B26B 29/06
USPC ............... 30/90.4, 90.8, 92.5, 378, 280, 294
See application file for complete search history.

(56) References Cited

U.S. PATENT DOCUMENTS

| | | | | | |
|---|---|---|---|---|---|
| 1,165,176 | A | * | 12/1915 | Hornor | H02G 1/1229 81/9.41 |
| 1,739,972 | A | * | 12/1929 | Klinger | H02G 1/1217 30/2 |
| 1,801,706 | A | * | 4/1931 | Westfall | H02G 1/1217 30/289 |
| 2,013,893 | A | * | 9/1935 | Matthews | B26D 1/045 83/455 |
| 2,050,439 | A | * | 8/1936 | Marx | B26B 5/006 30/162 |
| 2,187,215 | A | * | 1/1940 | Spinello | H02G 1/1229 30/91.2 |
| 2,235,342 | A | * | 3/1941 | Turner | A47J 17/06 30/294 |
| 2,385,368 | A | * | 9/1945 | Montgomery | H01B 7/36 30/91.2 |
| 3,153,853 | A | * | 10/1964 | Lipton | B43M 7/002 30/294 |
| 3,161,088 | A | * | 12/1964 | Tolman | H02G 1/1224 81/9.44 |
| 3,238,618 | A | * | 3/1966 | Cook, Jr. | H02G 1/1217 30/287 |
| 3,383,768 | A | * | 5/1968 | Glen, V | B43M 7/002 30/287 |

(Continued)

FOREIGN PATENT DOCUMENTS

JP 03244490 A * 10/1991 ............. B26B 27/00

OTHER PUBLICATIONS https://www.youtube.com/watch?v=cWQUSc_HYml.*
https://terrylove.com/forums/index.php?threads/disconnecting-the-hose-at-the-sprinkler-head-barbed-fitting.70128/.*
https://www.rapidtables.com/calc/wire/wire-gauge-chart.html.*

*Primary Examiner* — Laura M Lee
(74) *Attorney, Agent, or Firm* — Andrew D. Fortney; Central California IP Group, P.C.

(57) ABSTRACT

A landscaping dripper system tool that safely enables releasing drip irrigation feeder pipe from the barbs of connected fittings and end-point devices; emitters, sprayers, manifolds, etc. The tool includes a channel and a parallel, recessed knife blade that receives and cuts the irrigation tubing wall, releasing the feeder pipe from the connected barbed fitting. The knife blade tip extends into the channel to a depth based on a standard irrigation tubing wall thickness, so when the operator slides the tubing with attached barb along the channel, the tubing wall is safely cut.

20 Claims, 7 Drawing Sheets

(56) References Cited

U.S. PATENT DOCUMENTS

| | | | | |
|---|---|---|---|---|
| 3,478,427 A | * | 11/1969 | Tims, Jr. | B26B 5/005 30/293 |
| 3,624,901 A | * | 12/1971 | Pettit et al. | H02G 1/1229 30/91.2 |
| 3,726,010 A | * | 4/1973 | Yokoyama | B26B 5/002 30/335 |
| 3,791,014 A | * | 2/1974 | Perna | B26B 27/00 30/294 |
| 3,922,777 A | * | 12/1975 | Weitze | H05K 3/4611 361/779 |
| 3,988,826 A | * | 11/1976 | Heikkala | B26B 25/005 30/90.9 |
| 4,001,934 A | * | 1/1977 | Bell | B26B 27/00 30/124 |
| 4,017,958 A | * | 4/1977 | Diggs | F16L 37/008 29/268 |
| 4,106,196 A | * | 8/1978 | Smithline | B26B 27/00 30/286 |
| D255,981 S | * | 7/1980 | Carbo | D8/107 |
| 4,426,778 A | * | 1/1984 | Christie | H02G 1/1224 30/90.1 |
| 4,459,745 A | * | 7/1984 | Britton | H02G 1/1217 30/90.4 |
| 4,463,494 A | * | 8/1984 | Bianco, Jr. | A44C 17/043 30/90.4 |
| 4,522,339 A | * | 6/1985 | Costa | A01G 25/026 239/600 |
| 4,536,957 A | * | 8/1985 | Britton | H02G 1/1217 81/9.4 |
| 4,543,717 A | * | 10/1985 | Luka | H02G 1/1265 30/90.1 |
| 4,615,116 A | * | 10/1986 | Hanson | H02G 1/1295 30/90.4 |
| D291,651 S | * | 9/1987 | Sieg | D8/98 |
| 4,693,004 A | * | 9/1987 | Plana | B26B 25/005 30/265 |
| 4,858,315 A | * | 8/1989 | Tanner | H02G 1/1226 81/9.44 |
| 4,951,393 A | * | 8/1990 | Wallace | H02G 1/1229 81/9.4 |
| 5,127,161 A | * | 7/1992 | Ikeda | B43M 7/002 30/294 |
| 5,337,479 A | * | 8/1994 | Ducret | H02G 1/1229 30/91.2 |
| 5,555,624 A | * | 9/1996 | McCracken | B26B 29/06 30/294 |
| 5,632,088 A | * | 5/1997 | Naso | E04G 21/12 30/91.2 |
| 5,666,731 A | * | 9/1997 | Rungren | B26B 29/06 30/294 |
| 5,992,286 A | * | 11/1999 | Boole | B65B 69/0033 30/280 |
| D419,417 S | * | 1/2000 | Kane | D8/98 |
| D423,318 S | * | 4/2000 | Lacy | D8/98 |
| D424,397 S | * | 5/2000 | Wiseman | D8/98 |
| 6,108,910 A | * | 8/2000 | Sorkin | H02G 1/1221 30/91.2 |
| 6,148,521 A | * | 11/2000 | Eslambolchi | G02B 6/4497 30/90.4 |
| D435,775 S | * | 1/2001 | Rothschild | D8/98 |
| 6,430,767 B1 | | 8/2002 | Ramos | |
| 6,581,262 B1 | | 6/2003 | Myers | |
| 6,581,291 B1 | * | 6/2003 | Tarpill | G02B 6/25 30/90.1 |
| D477,520 S | * | 7/2003 | McCracken | D8/98 |
| 6,615,495 B1 | * | 9/2003 | Evens | B26B 29/06 30/294 |
| 6,691,403 B1 | | 2/2004 | Murg | |
| 6,769,181 B1 | * | 8/2004 | Scheuerman | B23D 21/02 30/130 |
| 6,901,643 B1 | | 6/2005 | Krasner | |
| 6,928,708 B1 | | 8/2005 | Larock | |
| D525,851 S | * | 8/2006 | Turnbull | D8/98 |
| 7,185,409 B1 | | 3/2007 | Myers | |
| 8,136,252 B2 | | 3/2012 | Linden | |
| 8,418,372 B1 | * | 4/2013 | Risley, Sr. | B26B 29/06 30/294 |
| 8,898,876 B2 | | 12/2014 | Feith | |
| 8,978,226 B2 | | 3/2015 | Kady | |
| 10,071,449 B1 | | 9/2018 | Donofrio | |
| 10,201,249 B2 | * | 2/2019 | Bagley | B26B 29/00 |
| 10,391,512 B1 | | 8/2019 | Samuel | |
| 10,834,984 B2 | | 11/2020 | Farnum | |
| 10,919,164 B2 | | 2/2021 | Gilbertson | |
| 10,994,429 B2 | | 5/2021 | Wang | |
| 11,059,196 B2 | * | 7/2021 | Samari | B26D 7/0006 |
| 2003/0200663 A1 | | 10/2003 | Clanton | B26B 29/06 30/294 |
| 2006/0032057 A1 | * | 2/2006 | Sieke | B26D 3/28 30/280 |
| 2006/0075643 A1 | * | 4/2006 | Shafeek | G07D 9/00 30/280 |
| 2020/0086519 A1 | * | 3/2020 | Samari | B26B 3/08 |

\* cited by examiner

DRIP IRRIGATION FEEDER PIPE SLICER TOOL AND METHOD OF DETACHING BARBED FITTINGS AND DEVICES USING THE SAME

FIELD OF THE INVENTION

The present invention generally relates to tools and implements used in agricultural irrigation. More specifically, embodiments of the present invention pertain to a tool used in the repair, maintenance and reconfiguration of an installed drip irrigation system, as well as methods for the removal of micro irrigation piping or tubing from a barbed fitting or connector.

DISCUSSION OF THE BACKGROUND

Drip irrigation systems, such as those used in agriculture, commercial and home improvement sales channels, are well known and in widespread use world-wide. Most such drip irrigation systems provide lengths of irrigation conduit ranging from ½--1 inch (1.2-2.5 cm) poly(vinyl chloride) (PVC) or polyethylene, and serve as a water volume delivery conduit or "back-bone" for ½ inch (1.2-1.3 cm) attaching connectors, "T" fittings and threaded pipe multi-port manifolds having ¼ inch (0.6-0.65 cm) micro barbed feeder ports that connect ¼ inch (0.6-0.65 cm) feeder pipe for delivering water to individual plants, hanging flower baskets, etc. These end-point devices connected thru a network of ¼ inch (0.6-0.65 cm) feeder pipes are capable of supporting ¼ inch (0.6-0.65 cm) dripper line fittings such as connectors, "T"s, elbows, and many varying types of barbed devices including in-line and end-point emitters, drippers, micro sprayers, bubblers, etc. A typical home installation of a drip system may include over 100 end-water drip service points, supported thru a network of ¼ inch (0.6-0.65 cm) micro feeder pipe having from five to ten "backbone" multiport ½ inch (1.2-1.3 cm) manifolds.

During the course of time and seasons, the drip lines and barbed devices need to be replaced (e.g., due to reconfigured gardens). Also, the drip lines can be damaged by general garden digging, rototilling, replacing or adding of plants, and even rodent and animal plastic end-chewing. Furthermore, barbed end-dripping devices can become clogged, leading to the need to replace certain sections of the line. Changing a section of the drip line requires releasing the feeder pipe from the "backbone" manifold end, and replacing some or all of the ¼ inch (0.6-0.65 cm) micro feeder pipe, as well as replacing the end dripping device in some cases. Unfortunately, the multi-station manifold barbs and the barbed dripping devices and fittings are not always easily detached from the feeder pipe, and are often damaged in the repair process. In fact, many suppliers simply suggest that they be discarded along with the damaged feeder pipe section(s), and replaced with new ones. Unfortunately, such actions are wasteful, add to landfills, and are not environmentally friendly.

Common ways to cut out the damaged feeder pipe and install new feeder pipes include using a retractable razor blade, a utility knife, or scissors to cut the pipe. The razor blade, utility knife and scissors, of course, can be dangerous to use when cutting along a slippery micro irrigation pipe.

One approach for solving the problem(s) with detaching micro irrigation tubing is shown in U.S. Pat. No. 6,928,708, entitled "Hand-Held Device for Selectively Attaching or Detaching a Water Drip System Connector or Plug." The '708 patent discloses a tool that detaches micro drip connectors to typical ½ inch (1.2-1.3 cm) to ⅝ inch (1.55-1.6 cm) polyethylene conduits, but does not use a blade to cut a pipe. The tool grabs a barbed connector and requires the operator to use force to pull the barbed connector out of the conduit, detaching it. This practice can result in tearing of the polyethylene conduit hole by the barb, making the conduit unusable. In addition, the '708 patent does not address the myriad of other barbed fittings and devices such as emitters, in-line and end-point drippers, sprayers or micro feeder pipe. U.S. Pat. No. 6,430,767, entitled "Tool for Installing Emitters for Drip Irrigation," and U.S. Pat. No. 7,185,409, entitled "Installation Tool for Irrigation Emitter Barbs with Cutter," also disclose drip irrigation tools.

According to a 2021 National Gardening Association survey, research showed that 16 million new gardeners were added during the COVID-19 pandemic, many of whom are under 35. Many of those new gardeners are environmentally conscious and eager to use water-saving approaches such as drip irrigation and micro irrigation. Thus, there is a sizable and growing demand for a tool that enables facile and reliable separation of drip irrigation or micro irrigation pipes from barbed connectors so that the barbed connectors can be saved and reused.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

Embodiments of the present invention are directed to a tool having a channel of predetermined length, wherein the channel has two channel ends, and a channel width. The tool may have a fixed blade having a length or edge positioned longitudinally to the channel, and a blade tip extending into the channel at one of the channel ends, and an indicator configured to inform the user of the position of the blade tip relative to the one channel end. The channel ends may comprise or consist of a front end and a back end. The predetermined length of the channel may be from about 0.5 inch (1.2 cm) to about 2.5 inches (6.3 cm), and is preferably about 2 inches (5.0-5.1 cm). The channel width may be from about 0.2 inches (0.5 cm) to about 0.5 inch (1.3 cm), and is preferably about 0.25 inch (0.6-0.65 cm). The blade tip may extend for a distance of from about 0.025 inch (0.06 cm) to about 0.045 inch (0.12 cm) into the channel, preferably about 0.0375 inch (0.09-0.1 cm). The indicator may indicate the position of the blade tip relative to the channel front end.

Another aspect of the invention relates to a method or process of releasing a barbed irrigation fitting from micro irrigation piping having a length, an end, and a wall with a thickness, comprising fixably positioning the micro irrigation piping along the predetermined length, aligning the blade with the end of the micro irrigation piping, applying pressure to the blade to effect an incision in the micro irrigation piping wall at the end, and directing the blade to cut through the wall longitudinally along the length of the micro irrigation piping for a sufficient distance to release the micro irrigation piping from the barbed fitting. In various embodiments, the method uses a cutting tool having the channel and the blade, the blade is fixed longitudinally with respect to the channel, and the micro irrigation piping is fixably positioned in the channel. In such embodiments, applying pressure to the blade may comprise applying pressure to the tool so that the blade effects the incision, and directing the blade to cut through the wall may comprise directing the tool so that the blade cuts through the wall.

A further aspect of the invention relates to a method or process of making a cutting tool for micro irrigation piping, comprising forming a channel of predetermined length, fixing a blade relative to the channel, and positioning an indicator. The channel has two ends and a channel width. The blade is fixed so that (i) a length or edge of the blade is positioned longitudinally to the channel and (ii) a tip of the blade extends into the channel at one of the two ends. The indicator informs a user of the cutting tool of a position of the blade tip relative to the one channel end.

In some embodiments, the method may further comprise forming a housing configured to place the blade in a fixed position with respect to the channel, and attaching the channel to or integrating the channel with the housing. In further embodiments, the method may further comprise placing the blade in a predetermined blade space in the housing. The predetermined blade space may be defined by a plurality of blade guides in the housing and a blade slot in or above the channel.

Features and advantages of the present invention will become readily apparent from the detailed description of various embodiments below. Further objects and advantages of this invention will become apparent from the following description, and the features of novelty that characterize this invention will be pointed out with particularity in the claims annexed to and forming a part of this specification.

DETAILED DESCRIPTION

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The term "length" generally refers to the largest dimension of a given 3-dimensional structure or feature. The term "width" generally refers to the second largest dimension of a given 3-dimensional structure or feature. The term "thickness" generally refers to a smallest dimension of a given 3-dimensional structure or feature. The length and the width, or the width and the thickness, may be the same in some cases. A "major surface" refers to a surface defined by the two largest dimensions of a given structure or feature, which in the case of a structure or feature having a circular surface, may be defined by the radius of the circle.

For the sake of convenience and simplicity, the terms "pipe," "tube," "hose," "conduit," and grammatical variations thereof are generally used interchangeably herein, but are generally given their art-recognized meanings. Also, for convenience and simplicity, the terms "connected to," "coupled with," "coupled to," and "in communication with," may be used interchangeably, but these terms are also generally given their art-recognized meanings.

In addition, for convenience and simplicity, the terms "part," "portion," and "region" may be used interchangeably but these terms are also generally given their art-recognized meanings. Also, unless indicated otherwise from the context of its use herein, the terms "known," "fixed," "given," "set," "certain" and "predetermined" generally refer to a value, quantity, parameter, constraint, condition, state, process, procedure, method, practice, or combination thereof that is, in theory, variable, but is typically set in advance and not varied thereafter when in use.

In the present application, both English system measurements and metric measurements are provided. To some extent, when an English system measurement and a metric measurement are next to each other, the different measurements are generally equivalent, but since micro irrigation systems in the U.S. (which uses the English system) and the rest of the world (which uses the metric system) are constructed according to different standards, the different measurements may also be independent of each other.

The invention, in its various aspects, will be explained in greater detail below with regard to exemplary embodiments.

Exemplary Micro Irrigation Piping Cutting Tools

Figure 1:
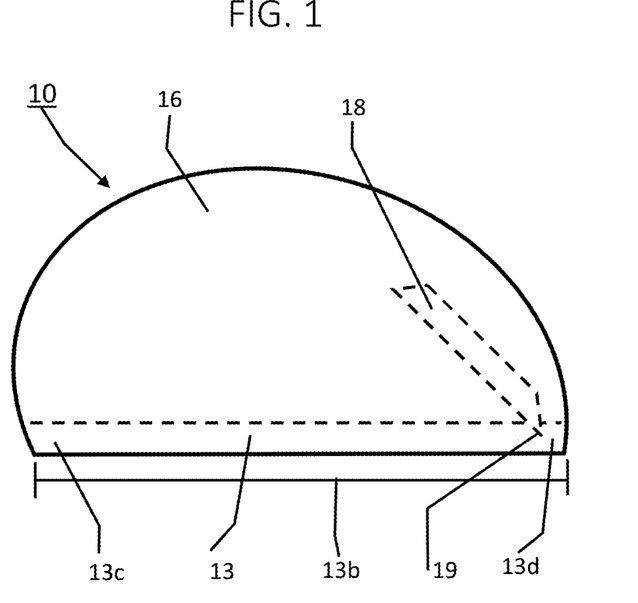
FIG. 1 is a first side view of an embodiment of the present invention.
Figure 2:
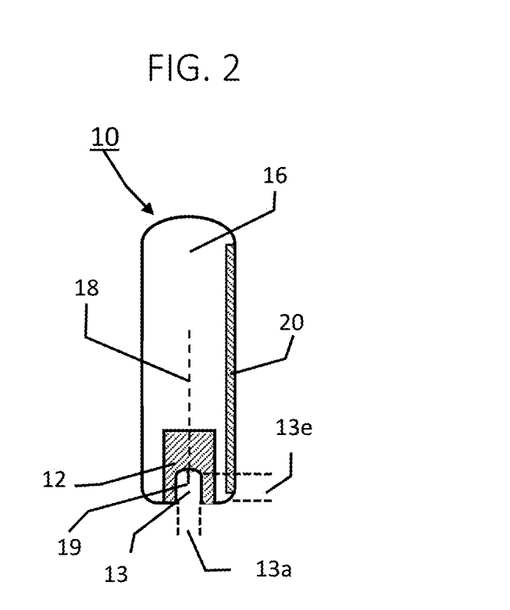
FIG. 2 is an end view of the embodiment of FIG. 1.
Figure 3:
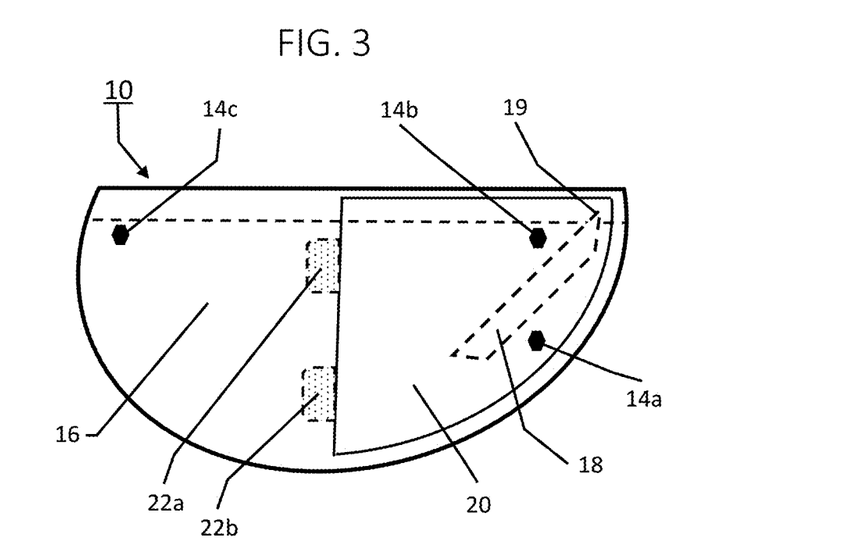
FIG. 3 is an alternative side view of the embodiment of FIG. 1.

Referring more particularly to the drawings by characters of reference, FIGS. 1-3 disclose one embodiment of an irrigation tool 10. As shown in FIG. 1, irrigation tool 10 comprises a base platform 16, a channel space 13, and a knife blade 18 with a knife tip 19. As shown in FIG. 1, the channel space 13 has a channel length 13b, a channel back end 13c, and a channel front end 13d. The knife tip 19 extends into the channel space 13 to a set depth based upon pipe wall standards, but preferably, the depth is about 0.03 inches (about 0.075 cm) to about 0.05 inches (about 0.13 cm). In one embodiment, the channel length 13b may be from about 1 inch (about 2.5 cm) to about 3.5 inches (about 9 cm), preferably from about 2 inches (about 5 cm) to about 3 inches (about 7.6 cm), and is most preferably about 2.5 inches (about 6.3-6.4 cm).

As shown in FIG. 2, the irrigation tool 10 comprises a base platform 16 having a channel member 12 at a ventral end, side or edge, wherein the channel member 12 defines a U-shaped channel space 13, having a channel width 13a and a channel height 13e. In one embodiment, the channel width 13a may be from about 0.15 inch (about 0.4 cm) to about 0.4 inch (about 1 cm), preferably from about 0.2 inch (about 0.5 cm) to about 0.3 inch (about 0.75-0.8 cm), and most preferably about 0.25 inch (about 0.63-0.64 cm). In another embodiment, channel width 13a may be from about 0.3 inch (about 0.75-0.8 cm) to about 0.75 inch (about 1.9-2 cm), preferably from about 0.4 inch (about 1 cm) to about 0.6 inch (about 1.5 cm), and most preferably about 0.5 inch (about 1.25-1.3 cm). In one embodiment, channel height 13e may be from about 0.15 inch (about 0.4 cm) to about 0.4 inch (about 1 cm), preferably from about 0.2 inch (about 0.5 cm) to about 0.3 inch (about 0.75-0.8 cm), and most preferably about 0.25 inch (about 0.63-0.64 cm). In another embodiment, channel width 13e may be from about 0.3 inch (about 0.75-0.8 cm) to about 0.75 inch (about 1.9-2 cm), preferably from about 0.4 inch (about 1 cm) to about 0.6 inch (about 1.5 cm), and most preferably about 0.5 inch (about 1.25-1.3 cm).

Also as shown in FIG. 2, the base platform 16 (or housing) holds the knife blade 18 having the knife tip 19 extending into the channel space 13. The base platform 16 may comprise a "clamshell"-type housing, having first and second opposed pieces that are configured to mate with each other to form the housing 16. The first and second pieces may be substantial mirror images of each other. In a preferred embodiment, the knife blade 18 is situated at the midline across the channel width 13a, and extends into the channel space 13 at a depth or distance of from about ⅙ of the channel height 13e to about ⅓ of the channel height 13e.

As shown in FIGS. 2 and 3, the knife blade 18 is fixably attached to the base platform 16. In one embodiment, the base platform 16 has a space with a slot defined for example by blade guides 57a-b (FIG. 15) to hold the knife blade 18, and a cover 20 (FIG. 3) to secure the knife blade 18 in place and to keep the user's hand from contacting the knife blade 18 and the knife blade tip 19. Cover 20 is positioned in place on the base platform 16 by tabs 22a and 22b that extend into recesses (not shown) in the base platform 16, and is held in place by retaining screws 14a and 14b. When properly positioned, the outer surface of the cover 20 is flush against and/or coplanar with the outer surface of the base platform 16 of the tool 10. The channel member 12 is held in place on base platform 16 by retaining screws 14b and 14c. Retaining screw 14b holds both cover 20 and channel member 12 in place. Alternatively, both the cover 20 and the channel member 12 can be secured in place using conventional tongue-in-groove fastening mechanisms that slide together and/or snap together. In other alternatives, the cover 20 can be omitted (i.e., the two opposed pieces of the clamshell housing 16 may be mirror images of each other), and/or the channel 12 can be integrated into the clamshell housing 16.

Figure 4:
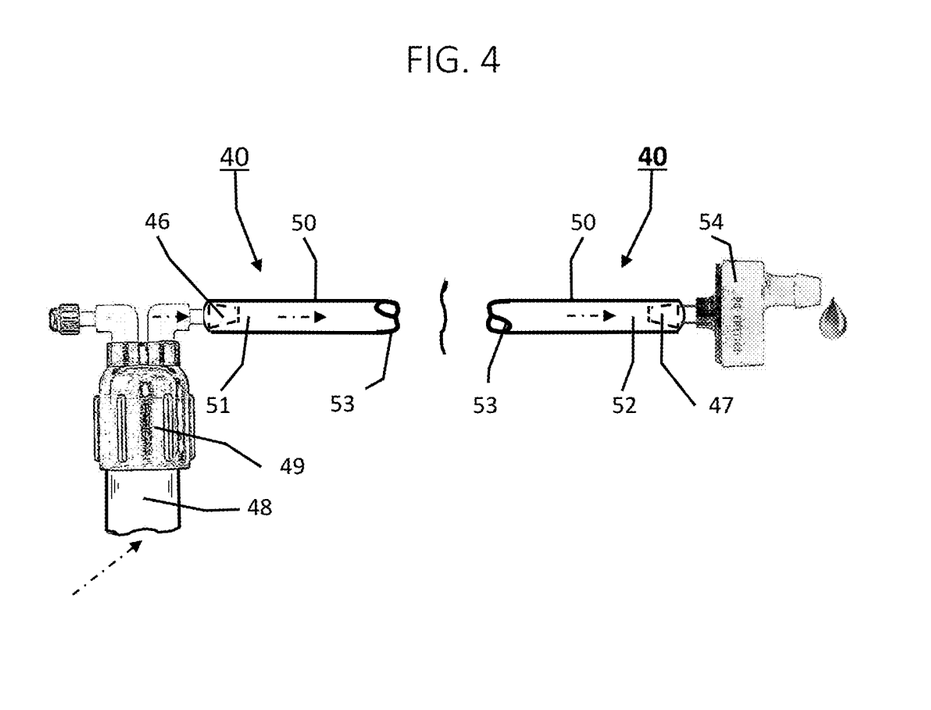
FIG. 4 is a side view of a micro irrigation system, including a feeder pipe connected to a water intake conduit through a two-station distribution manifold on the intake end, and fitted to a dripper/emitter on the exiting end.

FIG. 4 is a side view of a feeder pipe connected to a water intake conduit, feeding into an intake two station distribution manifold on one end, and fitted to a feeder pipe and dripper/emitter on the exiting end. As shown in FIG. 4, a feeder pipe 40 comprises a feeder pipe wall 50, a feeding end 51, and a dripping end 52, and a cross section 53. In operation, the water flow follows the dashed arrows, from a pressurized water source through a conduit 48, through a manifold 49 with barbed connectors 46, into the feeding end 51 of the feeder pipe 40 through dripping end 52, which connects to a dripper 54 with a barbed connector 47, then out of the dripper 54 (e.g., to a plant).

In one embodiment, the conduit 48 may have a cross-sectional width (i.e., diameter) of about 0.5 inch (about 1.2-1.3 cm). The conduit 48 typically comprises relatively hard or stiff plastic (e.g., PVC, polyethylene [PE], polyvinyl, polyurethane, etc.) pipe, having a wall thickness and a modulus of elasticity or shear modulus that resists bending at room temperature by manual efforts of an adult human male of average height and weight. For example, the conduit 48 may have a shear modulus of at least 0.05 GPa and/or a modulus of elasticity of at least 1 GPa (the latter according to DIN EN ISO 527-1A, using a test specimen at a testing speed of 1 mm/min). On the other hand, the feeder pipe 40 generally comprises a soft plastic or rubber (e.g., latex, natural rubber, polychloroprene, silicones, etc.), having a wall thickness and a modulus of elasticity or stiffness that allow facile bending and at least some stretching at room temperature by manual efforts of an adult human male of average height and weight, and a porosity that prevents leakage of water through the wall of the pipe 40. For example, the feeder pipe 40 may have a shear modulus of less than 0.05 GPa and/or a modulus of elasticity of at least 10 MPa, but less than 1 GPa (the latter according to DIN EN ISO 527-1A, using a test specimen at a testing speed of 1 mm/min).

Figure 5:
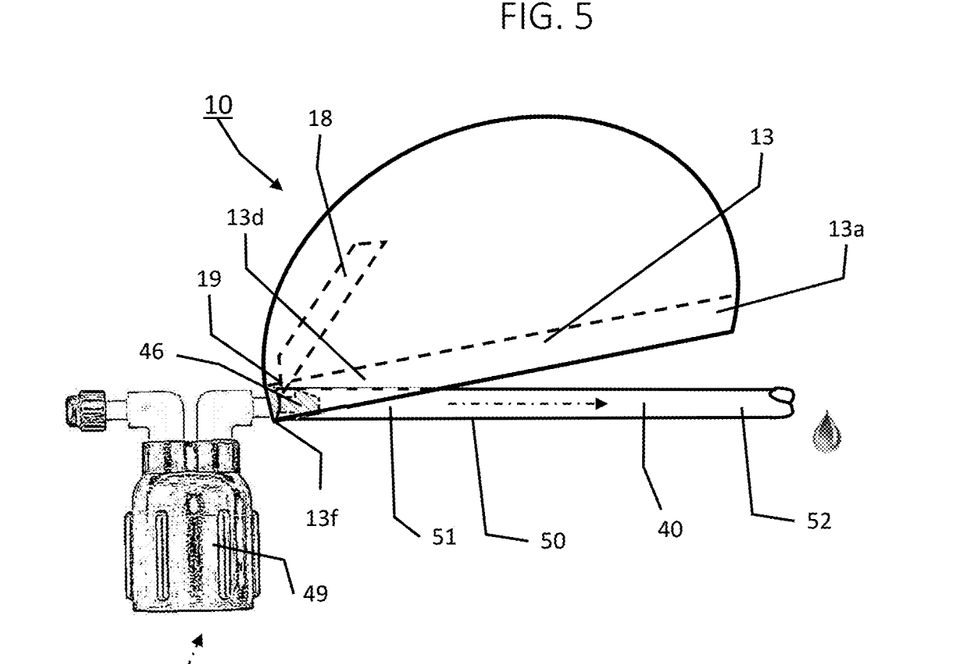
FIG. 5 is a side view of the exemplary tool of FIG. 1, holding the feeder pipe at the manifold connector end, ready to fix the feeder pipe in the channel and/or initiate a cut.
Figure 6:
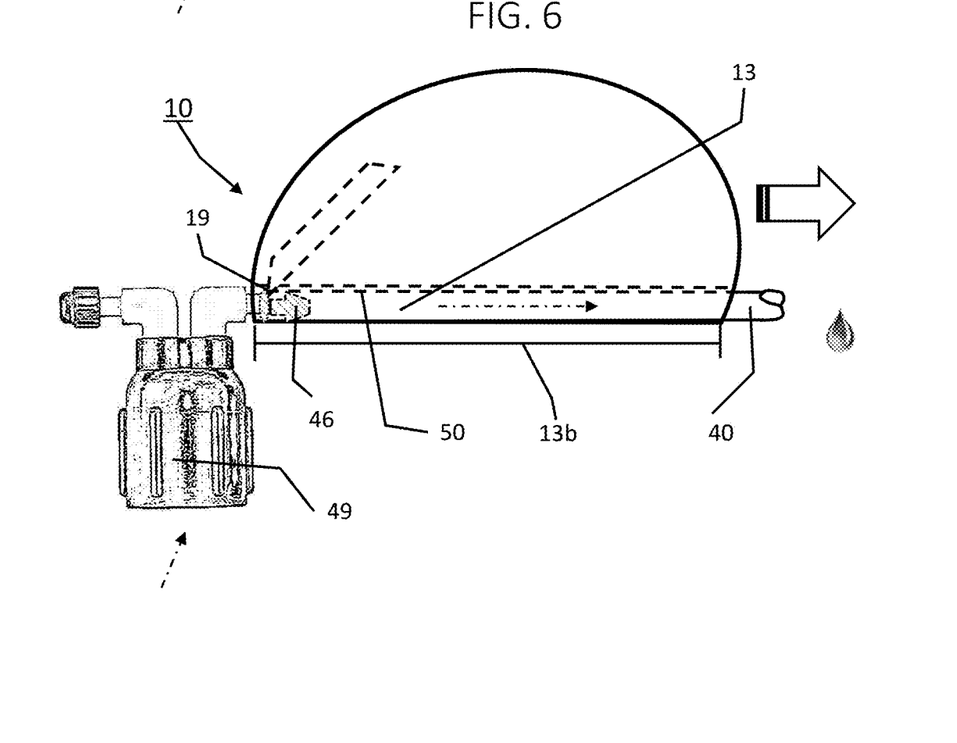
FIG. 6 is a side view of the embodiment of FIG. 5, with the tool fitted to the feeder pipe and the feeder pipe is in the channel of the tool, ready to initiate a cut and separate the feeder pipe from the manifold connector.

The tool 10 in operation can separate a barbed manifold 49 from a feeder pipe (and vice versa), and can also separate a barbed dripper 54 from a feeder pipe (and vice versa). As shown in FIG. 5, the tool 10 in operation holds the feeder pipe 40 having a tightly connected barbed manifold 49 in place at the feeding end 51 within the channel space 13 at the channel front end 13d. The front edge 13f of the tool 10 may serve as an indicator of where to position the tool 10 so that the knife blade 19 is properly positioned relative to the feeding end 51 and/or to the barbed connector 46. The knife blade tip 19 may be positioned from about 0.04 inch (about 0.1 cm) to about 0.10 inch (about 0.25 cm) from front edge 13f, preferably about 0.07 inch (about 0.15-0.2 cm) from the front edge 13f. When the feeder pipe 40 is thus positioned, the user presses down on the tool 10, and the pressure causes the knife blade tip 19 to make an incision into or through the feeder pipe wall 50 at or near the edge of the feeder pipe 40. As shown in FIG. 6, after the user has made the incision by knife blade tip 19, the user lowers the remainder of the tool 10 so that the feeder pipe 40 rests within the channel 13 along the channel length 13b. The user then pulls tool 10 away from the manifold 49 (as shown by the solidly outlined arrow), making a cut along the pipe wall 50. The cut causes the pipe wall 50 to release from the barbed connection 46 to the manifold 49, releasing the feeder pipe 40 from the manifold 49. In various embodiments, the cut may be from about 0.25 inch (about 0.63-0.64 cm) to about 0.8 inch (about 2 cm) in length, preferably from about 0.3 inch (about 0.75-0.8 cm) to about 0.7 inch (about 1.7-1.8 cm), and most preferably about 0.5 inch (about 0.12-0.13 cm).

Figure 7:
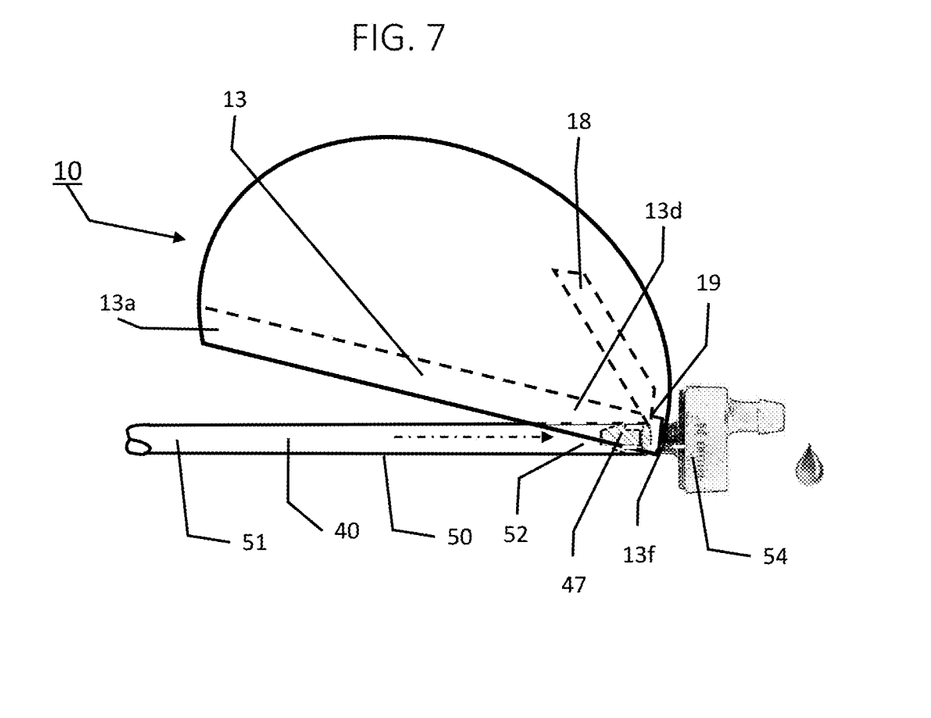
FIG. 7 is a side view of the exemplary tool of FIG. 1, holding a feeder pipe at the drip emitter end, ready to fix the feeder pipe in the channel and/or initiate a cut.
Figure 8:
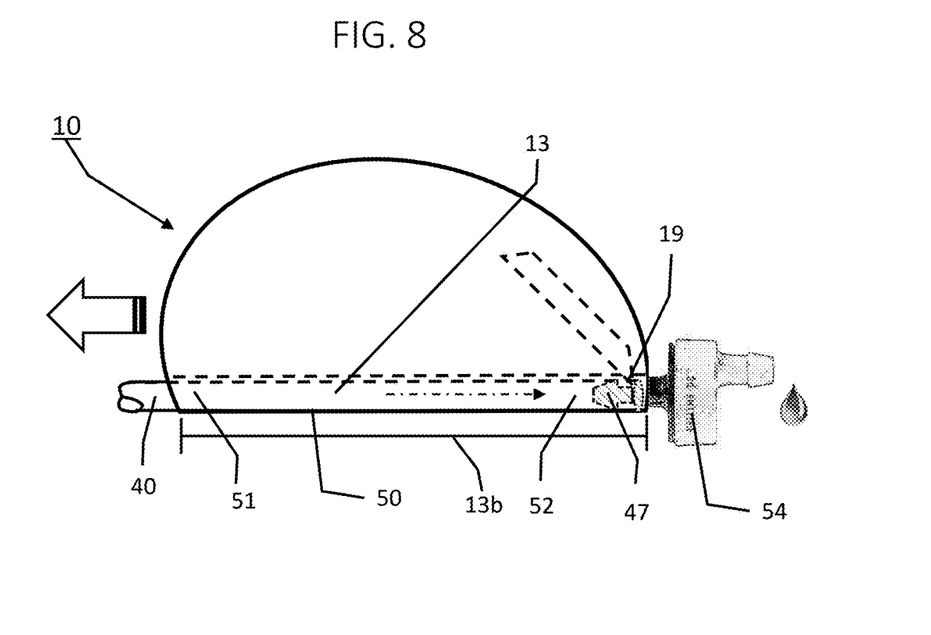
FIG. 8 is a side view of the embodiment of FIG. 7, with the tool fitted to the feeder pipe and the feeder pipe is in the channel of the tool, ready to initiate a cut and separate the feeder pipe from the drip emitter connector.

As shown in FIG. 7, the tool 10 in operation holds the feeder pipe 40 having a tightly connected barbed dripper 54 in place at the dripping end 52 within the channel space 13 at the channel front end 13d. The front edge 13f of the tool 10 may serve as an indicator of where to position the tool 10 so that the knife blade tip 19 is properly positioned relative to the dripping end 52 and/or to the barbed connector 47. The knife blade tip 19 may be positioned from about 0.04 inch (about 0.1 cm) to about 0.10 inch (about 0.25 cm) from front edge 13f, preferably about 0.07 inch (about 0.15-0.2 cm) from the front edge 13f. When the feeder pipe 40 is thus positioned, the user presses down on the tool 10, and the pressure causes the knife blade tip 19 to make an incision into or through the feeder pipe wall 50. As shown in FIG. 8, after the user has made the incision with the knife blade tip 19, the user lowers the remainder of the tool 10 so that the feeder pipe 40 rests within the channel 13 along the channel length 13b. The user then pulls the tool 10 away from the dripper 54 (as shown by the solidly outlined arrow), making a cut along the pipe wall 50. The cut causes the pipe wall 50 to release from the barbed connection 47 to the dripper 54, releasing the feeder pipe 40 from the dripper 54. In various embodiments, the cut may be from about 0.25 inch (about 0.63-0.64 cm) to about 0.8 inch (about 2 cm) in length, preferably from about 0.3 inch (about 0.75-0.8 cm) to about 0.7 inch (about 1.7-1.8 cm), and most preferably about 0.5 inch (about 1.2-1.3 cm).

In operation, the tool 10 releases barbed fittings, such as the barbed connectors 46 and 47 on the manifold 49 and the dripper 54, from a feeder pipe 40 (and/or vice versa) in a manner that easily positions the feeder pipe 40 in relation to the knife blade tip 19 (or vice versa) to make an incision along the feeder pipe 40 that opens up the feeder pipe 40 without damaging the barbed connectors 46 and 47, and easily enables a simple cutting motion to release the barbed fittings. In use, when placing the feeder pipe 40 attached to a barbed connector 46 or 47 in the tool 10 within channel space 13 and performing a single, short pulling motion, the precisely set cutting depth of the knife blade tip 19 passes through only the feeder pipe wall 50 at either the feeding end 51 or the dripping end 52, separating the feeder pipe 50 from the barbed fitting 46 or 47 and leaving the fittings 46 and 47 unharmed and reusable.

Replacing the knife blade 18 is similar to replacing batteries in a TV or garage door remote controller, or similar to replacement of a blade in a slide-out utility knife, as will be understood by those skilled in the art. As shown in FIG. 3, the knife blade 18 is readily replaceable by first removing the screws 14a and 14b, then sliding the cover 20 away from the recesses for the tabs 22a and 22b. The old knife blade 18 is removed, and a new knife blade 18 is inserted therein. The cover 20 is installed in reverse order of removal, with insertion of tabs 22a and 22b into their respective spaces in the base platform 16, then fastening the screws 14a, 14b. In addition, the blade 18 can be reversed so that an unused (or less-used) tip of the blade 18 (e.g., opposite from the blade tip 19) can be extended into the channel space 13.

In one or more embodiments, the housing 16 comprises a 2-piece clamshell base platform, preferably manufactured from and comprising a plastic (e.g., polyethylene, polypropylene, an epoxy polymer, a polycarbonate, a poly[meth]acrylate, etc.), held together by two or more (e.g., 3) metal (e.g., stainless steel or nickel) screws, with a metal (e.g., stainless steel or aluminum) or plastic knife blade replacement cover for new metal (e.g., stainless steel) or ceramic knife blade reusability. The tool includes a channel member, which may have a length of 2½" (6-6.5 cm) and an opening with a width of ¾" (0.6-0.65 cm) that permits firm holding and sliding of ¾" (0.6-0.65 cm) feeder pipe.

In one or more alternative embodiments, the tool is disposable. The tool includes a single blade, without a replacement cover, and the channel is integrated into the halves (first and second mirror image pieces) of the clamshell housing. For US standard micro irrigation feeder pipe, the channel has a width of ¼" (0.6-0.65 cm), and for European standard micro irrigation feeder pipe, the channel has a width of 6 mm. Such embodiment(s) are the least expensive to manufacture.

Figure 9:
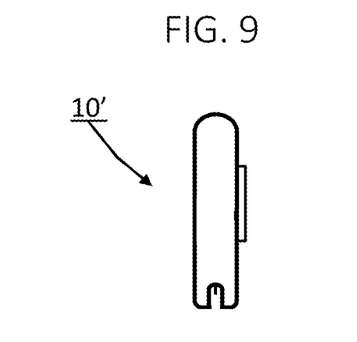
FIG. 9 is an end view of an embodiment of the present tool with a retractable blade.
Figure 10:
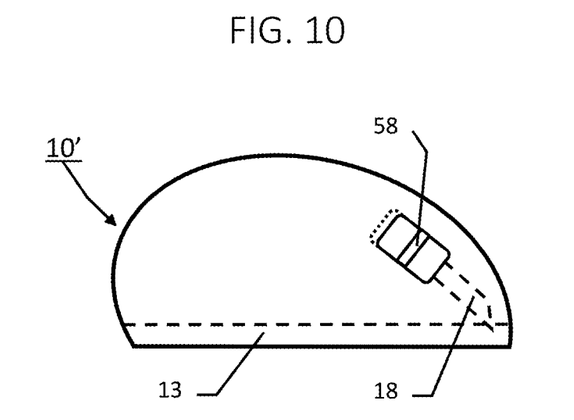
FIGS. 10-11 are side views of the embodiment of FIG. 9.
Figure 11:
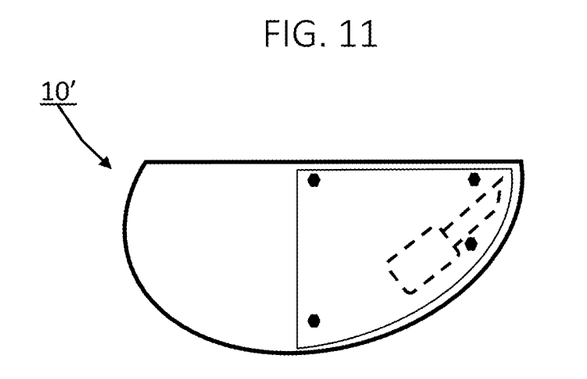

One or more additional embodiments relate to a tool with a retractable knife blade, for added safety and adjustable cutting depth versatility. The tool may have 2 or 3 settings for the positions of the knife blade tip. With two settings, the positions are "extended" (i.e., as disclosed for the tool 10 in FIGS. 1-3) and "retracted" (i.e., fully withdrawn from the channel). For example, FIGS. 9-11 shows an embodiment of the tool 10' with a slidable button or pad 58 that controls the position of the blade 18 with respect to the channel space 13. In FIG. 10, the blade 18 is extended into the channel space 13. With three settings, the positions may be "fully extended" (i.e., where the knife blade tip is in a position that cuts through the entire thickness of the micro irrigation tube wall, as disclosed for the tool 10 in FIGS. 1-3), "partially extended" (i.e., where the knife blade tip is in a position that cuts through the thickness of the micro irrigation tube wall, and "retracted". The tool 10' with a retractable blade of FIGS. 9-11 is similar to, but larger than, the tool 10 of FIGS. 1-3. The retractable tool 10' having a larger base platform or housing supports, secures and/or cuts a ½"-⅝" (1.2-1.6 cm) conduit and detaches ½"-⅝" (1.2-1.6 cm) barbed fittings.

Figure 12:
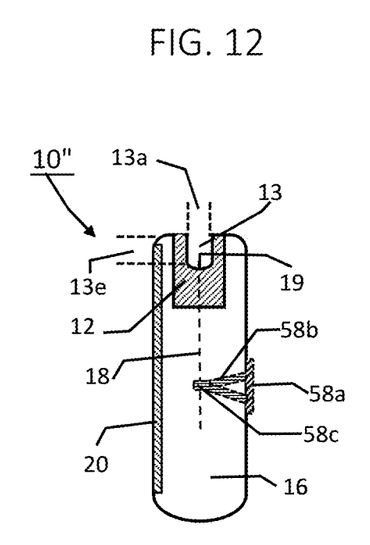
FIG. 12 is an end view of an alternative embodiment of the present tool with a retractable blade.
Figure 13:
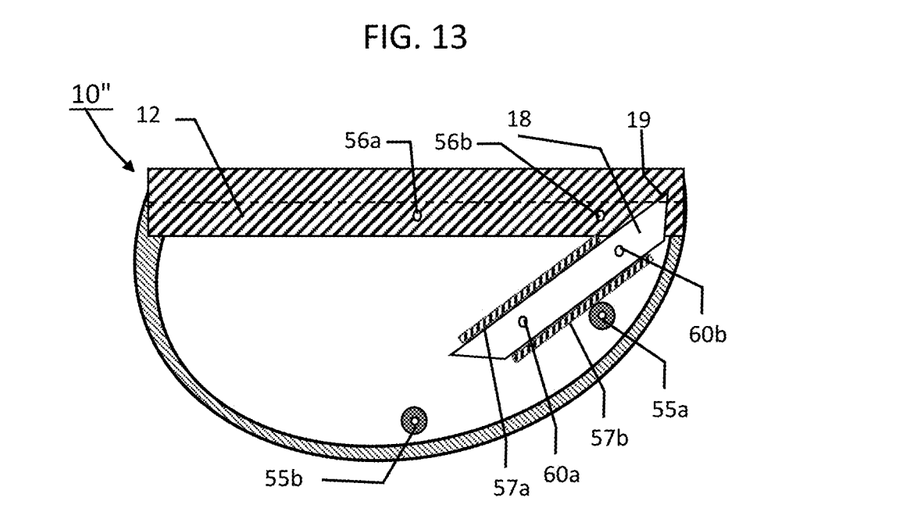
FIGS. 13-14 are side views of the embodiment of FIG. 12, with the blade extended and retracted, respectively.
Figure 14:
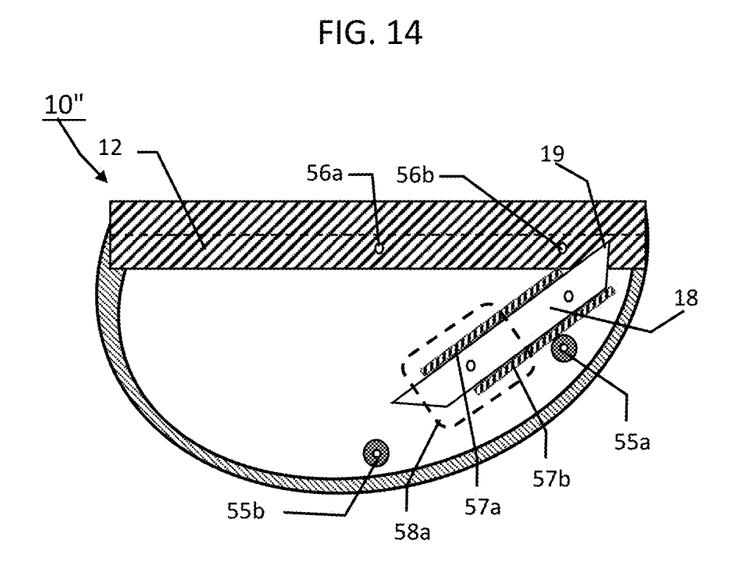

FIGS. 12-14 show an alternative embodiment of the tool 10" with a retractable blade 18, in which the channel 12 is detachable. FIG. 12 shows a stud or peg 58c extending from a V-shaped support post 58b, in turn attached to an inner surface of the button or pad 58a, that moves the blade 18 along a slot defined by blade guides 57a-b (FIGS. 13-14). The V-shaped support post 58b extends through a slot (not shown) in the base platform or housing 16, and the stud or peg 58c extends through a hole 60a in the blade 18. The hole 60b aligns with the stud or peg 58c when the blade 18 is flipped over (i.e., rotated 180° with respect to an axis of symmetry at a midpoint along the length of the blade). FIG. 13 shows the blade tip 19 extending into the channel space 13, and FIG. 14 shows the blade tip 19 retracted into the channel body 12.

In one or more further embodiments, the tool 10" is similar in size and function to a conventional utility knife, with a shorter channel of approximately one inch (about 2.5 cm). This embodiment, due to the presence of the channel, provides the same precise cutting angle and cutting depth as the tool 10 of FIGS. 1-3, with a retractable blade. Most landscapers are familiar with and experienced in using utility knives, so using a tool with a form factor similar to a conventional utility knife may have some advantages.

In an alternative embodiment, the blade may be mounted in an orientation opposite to that in FIGS. 1-3, and optionally in a vertical or substantially vertical orientation, in which case the cutting direction may be reversed. Also, a "sewing seam ripper" style pipe-wall cutting tool may be designed. However, operational safety concerns (e.g., the risk of cut fingers) and lack of experience with sewing techniques in the irrigation and landscaping industries may make such a solution less attractive.

In a further alternative embodiment, the tool includes one or more pairs of grooved rollers in place of the channel. The pair(s) of opposed rollers securely hold the feeder pipe and allow the pipe to move or slide as the blade cuts the pipe wall. This tool is similar to the tool of FIGS. 1-3, with the same precise cutting angle and cutting depth, and which can optionally include a retractable blade. This alternative embodiment can also have a form factor similar in size to a conventional utility knife.

While many different materials could be used to manufacture a precise cutting tool like this, aluminum or plastics for the housing and channel and stainless steel screws and blade(s) may be ideal for cost and product durability. Several interchangeable channels with different sizes (e.g., channel widths) may be included in some embodiments, so that the same tool body (housing) can be used for ¼" US or 6 mm metric micro irrigation piping, as well as for ½" thru ⅝" (1.2-1.6 cm) polyethylene conduit/tubing and barbed fittings, which may be used with the same housing, or in a larger tool.

Exemplary Methods of Releasing Micro Irrigation Tubing from a Barbed Connector

A further aspect of the invention relates to a method of releasing micro irrigation piping from a barbed irrigation fitting (or vice versa). The micro irrigation piping has an end, a wall with a thickness, and a length. The method comprises fixably positioning the micro irrigation piping along the length of the micro irrigation piping, aligning a blade with the end of the micro irrigation piping, applying pressure to the blade to effect an incision in the wall of the micro irrigation piping at the end, and directing the blade to cut through the wall, longitudinally along the length of the micro irrigation piping, for a sufficient distance to release the micro irrigation piping from the barbed fitting.

In some embodiments, the micro irrigation piping is fixably positioned in the channel of a cutting tool in which the blade is fixed longitudinally with respect to the channel, as described herein. In such embodiments, the cutting tool may further comprise a housing configured to fix the positions of the channel and the blade.

In embodiments of the method that use the tool, applying pressure to the blade comprises applying pressure to the tool so that the blade effects the incision, and directing the blade to cut through the wall comprises directing the tool so that the blade cuts through the wall. Other aspects, embodiments and variations of the method of releasing micro irrigation piping from a barbed irrigation fitting (or vice versa) can be found elsewhere herein.

Exemplary Methods of Making a Cutting Tool

The present invention further relates to method of making a cutting tool for micro irrigation piping, comprising forming a channel of predetermined length, fixing a blade relative to the channel, and positioning an indicator to inform a user of the cutting tool of a position of said blade tip relative to one end of the channel. The channel has two ends and a channel width. The blade is fixed so that (i) a length or edge of the blade is positioned longitudinally to the channel and (ii) a tip of the blade extends into the channel at the one end.

For example, the base platform or housing may comprise two matching or mating pieces, forming a clamshell-type housing for the blade and channel. The pieces of the clamshell-type housing may be made by injection molding, for example, when the base platform or housing comprises a plastic. Alternatively, when the base platform or housing comprises a metal (e.g., aluminum, an aluminum alloy, or stainless steel), the pieces of the base platform or housing may be made by stamping, folding, and/or machining. The pieces of the base platform or housing may snap together (e.g., using tongue-in-groove or other conventional interlocking fittings) or be held together with screws, as described herein.

The cover (when present) and the channel may be made similarly to the base platform or housing. For example, when the cover and/or the channel comprises a plastic, it may be made by injection molding, and when the cover and/or the channel comprises a metal, it may be made by stamping, folding, and/or machining. When the channel comprises a piece separate from the base platform or housing, it may be secured or fixed to the base platform or housing using one or more screws (as described herein), or alternatively, conventional interlocking fittings or slidable fittings that allow one component to slide into a slot on the other component, and optionally, lock together with a ratchet- or tab-type securing mechanism. Alternatively, the cover and/or the channel may be integrated with the base platform or housing, as described herein.

Figure 15:
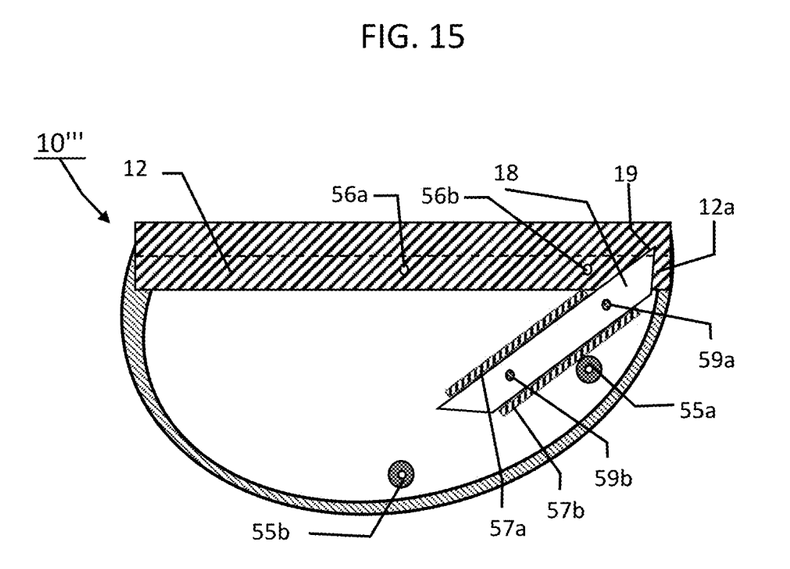
FIG. 15 is a view inside the base platform of an embodiment of the present tool with the blade in a fixed position.

As shown in FIG. 15, the blade 18 is mounted into the blade space defined by the blade guides 57a-b and a blade slot 12a in the channel member 12 in one of the pieces (or halves) of the base platform or housing. In some embodiments, the blade 18 may be further fixed in place by blade studs 59a and 59b, which may comprise pegs or posts extending from the inner wall of the one piece or half of the base platform or housing. The blade 18 may also be supported by one or more support posts, bars or rails (not shown) between the blade guides 57a-b, extending from the inner wall of the one piece or half of the base platform or housing, but not as far as the blade studs 59a and 59b. The blade studs 59a and 59b and the support post(s), bar(s) or rail(s) may be formed by molding (e.g., injection molding) or casting. The two pieces of the base platform or housing are secured or fixed together, as described herein. At this point, the basic tool is ready for use. The retractable tool is assembled similarly to a conventional utility knife.

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of releasing micro irrigation piping from a barbed irrigation fitting, the micro irrigation piping having an end, a wall with a thickness, and a length, comprising the steps of:
   a) fixably positioning said micro irrigation piping attached to said barbed irrigation fitting along said length in a channel of a cutting tool, said cutting tool having a base platform or housing, and said channel being integrated into or at a ventral end, side or edge of the base platform or housing and having a predetermined length, two channel ends and a channel space having a width of about 0.4 cm to about 0.8 cm;
   b) aligning a blade of the cutting tool with the end of said micro irrigation piping, said cutting tool having a base platform or housing configured to place or hold said blade in one or more predetermined positions with respect to said channel and at a center or midline of the channel space, said blade having a blade tip extending for a distance from about 0.06 cm to about 0.13 cm into said channel space at one of said two channel ends;
   c) applying pressure to said cutting tool to affect an incision in said wall of said micro irrigation piping at said end; and
   d) directing said blade to cut through said wall, longitudinally along said length of said micro irrigation piping to release said micro irrigation piping from said barbed irrigation fitting.

2. The method of claim 1, wherein the channel space has a height of from about 0.4 cm to about 1 cm, said blade tip extends about 0.09-0.12 cm into the channel space, and said predetermined length of said channel is from about 2.5 cm to about 9 cm.

3. The method of claim 1, wherein the base platform or housing has a front edge and a rear edge, wherein the step of aligning the blade of the cutting tool with the end of said micro irrigation piping comprises positioning the front edge of the base platform or housing on or over the end of said micro irrigation piping.

4. The method of claim 3, wherein the blade has a blade length or edge positioned longitudinally to said channel, and the blade tip extends into said channel space at the front edge of the base platform or housing.

5. The method of claim 1, wherein said two channel ends comprise a front end and and a back end, wherein the step of aligning the blade of the cutting tool with the end of said micro irrigation piping comprises positioning said front end on or over the end of said micro irrigation piping.

6. The method of claim 1, wherein the base platform or housing has a front edge and a rear edge, and the blade tip extends into said channel space at the front edge of the base platform or housing.

7. The method of claim 1, wherein the base platform or housing and the channel comprise a plastic.

8. The method of claim 7, wherein the base platform or housing comprises first and second opposed pieces of a clamshell-type housing that are configured to mate with each other and that join together to form the base platform or housing.

9. The method of claim 1, wherein the cutting tool comprises a channel member at the ventral end, side or edge of the base platform or housing, and the channel space is a U-shaped space in the channel member.

10. The method of claim 1, wherein the width of the channel space is about 0.5 cm to about 0.8 cm.

11. The method of claim 10, wherein the width of the channel space is 0.6-0.65 cm.

12. The method of claim 1, wherein said blade tip is in said channel about 0.1 cm to about 0.25 cm from said front edge along said channel length.

13. The method of claim 1, further comprising the step of retracting said blade into the base platform or housing.

14. The method of claim 2, wherein said predetermined length of said channel is about 5-6 cm.

15. The method of claim 1, wherein the channel is integrated with the base platform or housing.

16. The method of claim 1, wherein the one or more predetermined positions of the blade is/are defined by a plurality of blade guides in the base platform or housing and a blade slot in or above the channel.

17. The method of claim 1, wherein the base platform or housing comprises a slot defined by first and second blade guides to hold the blade.

18. The method of claim 1, further comprising the step of lowering the cutting tool so that the micro irrigation piping is in the channel space prior to the step of directing said blade to cut through said wall.

19. The method of claim 18, wherein the step of directing said blade to cut through said wall comprises pulling the cutting tool along the micro irrigation piping to release the micro irrigation piping from the barbed irrigation fitting.

20. The method of claim 19, wherein the cutting tool is pulled from about 0.63 cm to about 2 cm along the micro irrigation piping.

* * * * *